United States Patent
Kelly et al.

(10) Patent No.: US 7,405,923 B2
(45) Date of Patent: Jul. 29, 2008

(54) CIRCUIT BREAKER PANEL

(75) Inventors: Sean F. Kelly, Watertown, NY (US); John P. Gaus, Watertown, NY (US)

(73) Assignee: Golden Technology Management, LLC, Potsdam, NY (US)

( * ) Notice: Subject to any disclaimer, the term of this patent is extended or adjusted under 35 U.S.C. 154(b) by 62 days.

(21) Appl. No.: 11/429,512

(22) Filed: May 4, 2006

(65) Prior Publication Data
US 2006/0291148 A1    Dec. 28, 2006

Related U.S. Application Data

(60) Provisional application No. 60/677,729, filed on May 4, 2005.

(51) Int. Cl.
  *H02B 1/26* (2006.01)
(52) U.S. Cl. ............... 361/644; 174/72 A; 361/627; 361/637; 361/650
(58) Field of Classification Search ........... 361/627, 361/637, 644
See application file for complete search history.

(56) References Cited

U.S. PATENT DOCUMENTS

| | | | |
|---|---|---|---|
| 3,278,807 A | 10/1966 | Galante et al. | |
| 3,354,357 A * | 11/1967 | Stanback et al. | ............. 361/650 |
| 3,906,146 A * | 9/1975 | Taylor | ....................... 174/72 A |
| 4,667,268 A * | 5/1987 | Mrowka | ..................... 361/634 |
| 4,713,728 A | 12/1987 | Raabe et al. | |
| 4,720,769 A | 1/1988 | Raabe et al. | |
| 4,783,718 A | 11/1988 | Raabe et al. | |
| 5,113,312 A * | 5/1992 | Pratt et al. | ................... 361/650 |
| 5,225,962 A * | 7/1993 | Neill et al. | .................. 361/643 |
| 5,272,591 A | 12/1993 | Blue et al. | |
| 5,295,042 A | 3/1994 | Midgley et al. | |
| 5,313,372 A | 5/1994 | Chabert et al. | |
| 5,351,165 A * | 9/1994 | Hancock | ..................... 361/637 |
| 5,666,268 A | 9/1997 | Rix et al. | |
| 5,675,194 A | 10/1997 | Domigan | |
| 5,831,813 A | 11/1998 | Gomez | |
| 5,973,914 A | 10/1999 | Rose et al. | |
| 6,262,880 B1 | 7/2001 | Fischer et al. | |
| 6,320,732 B1 | 11/2001 | Norman et al. | |
| 6,472,605 B1 | 10/2002 | Griffith | |
| 6,707,256 B2 | 3/2004 | Brunker et al. | |
| 7,209,343 B2 * | 4/2007 | Remmert et al. | ............ 361/634 |

OTHER PUBLICATIONS

Search Report for International Patent Application No. PCT/US2006/017209; Sep. 5, 2007.

* cited by examiner

*Primary Examiner*—Gregory D Thompson
(74) *Attorney, Agent, or Firm*—Jason A. Bernstein; Powell Goldstein LLP

(57) ABSTRACT

The invention provides a circuit breaker panel with several safety features. The main breaker is separated from the circuit breakers by a non-conducting shield. The main breaker is also covered by a transparent, non-conducting shield. A further transparent non-conducting shield separates the circuit breakers from the neutral and ground bus bars. The neutral and ground bus bars are offset from one another to prevent wire crowding. Bending posts extending from the back plate of the panel help control the wire in the panel to prevent it from crossing bus bars or circuit breakers.

10 Claims, 6 Drawing Sheets

CIRCUIT BREAKER PANEL

CROSS-REFERENCE TO RELATED APPLICATIONS

This application claims priority from U.S. Provisional Patent Application Ser. No. 60/677,729, filed May 4, 2005.

FIELD OF THE INVENTION

The present invention relates to a breaker panel, more particularly, to a breaker panel having a unique layout, including safety dividers and wire bending posts.

BACKGROUND OF THE INVENTION

Injury from electrical shock is possible whenever operating or working in close proximity to electrical equipment. When a person's body completes a circuit, connecting a power source with the ground, an electrical burn or injury occurs. Fatal injuries may result from high-voltage exposure. For this reason electrical safety is important in both work and home environments. While professionals that service or work in close proximity to live power lines are trained in proper handling procedures, many injuries and deaths occur each year. Furthermore, untrained individuals are often exposed live power lines and the prospect of electrocution. Further, many residential fires are the result of unsafe or crowded electrical wiring.

A common place for someone to be injured by electrical shock is a breaker panel given the amount of work done at electrical panels and the likelihood of numerous electrical conductors in close proximity to the work being done. Generally, a breaker panel is a metal box in which multiple circuits are connected to a power source. The breaker panel also houses the individual circuit breakers that serve to automatically interrupt the flow of an electrical current. A breaker panel includes a main breaker which receives the power from the main service lines and provides a means for interrupting or cutting power to the facility or devices serviced by the breaker panel. Contact with the main service lines, as well as conductors exposed within the breaker panel can result in injury or death.

Blown fuses or tripped breakers are often perceived as the reason that electrical equipment ceases to operate. In an attempt to remedy the situation, trained and untrained individuals often seek out the breaker panels and investigate within. A variety of adverse conditions, such as absence of adequate lighting and improper tools, can compromise a person's ability to evaluate and work within the breaker panel. Unfortunately, the conditions outlined above, alone or in combination, can result in injury or death. Finally, crowded or improper wiring in breaker panels is sometimes a source of electrical fires.

Therefore, what is needed in the art is a breaker panel that includes safety devices that safeguard against inadvertent contact with live wires, that minimizes the potential for electrical faults and can aid in more orderly wiring of panels.

SUMMARY OF THE INVENTION

The present invention provides an improved breaker panel including safety shields, a unique bus bar configuration, and wiring bending posts. A safety shield over the main breaker covers the main lugs to thereby prevent a hand or a tool from contacting the main lugs. Thus the shield provides protection from electrocution for a person working on or near the breaker panel. Additional shields are provided, such as a shield separating the main breaker area from the circuit breaker area, and a shield separating the circuit breakers from the bus bars. The unique bus bar configuration of the present invention includes offset bus bars, such as by situating the neutral bus bar in a higher position than the ground bus bar. This configuration provides easier access to the ground or neutral bus and makes it easier to connect conductors to the ground bar or the neutral bar. Such offset thus reduces the chances that a person will connect more than the specified number of conductors to either the neutral or ground bus and reduces potential wire crowding. Such offset also reduces the chances that a person will connect a neutral conductor to a ground, or a ground conductor to neutral when the bus bars are meant to be unconnected. The breaker panel of the present invention also includes at least one bending post. The bending post allows for neat bending of wires within the breaker panel. The bending posts also prevent the wires from crossing over the circuit breakers and other components within the breaker panel.

BRIEF DESCRIPTION OF THE DRAWINGS

The present invention is disclosed with reference to the accompanying drawings, wherein.

Corresponding reference characters indicate corresponding parts throughout the several views. The example set out herein illustrates one embodiment of the invention but should not be construed as limiting the scope of the invention in any manner.

DETAILED DESCRIPTION

Figure 1:
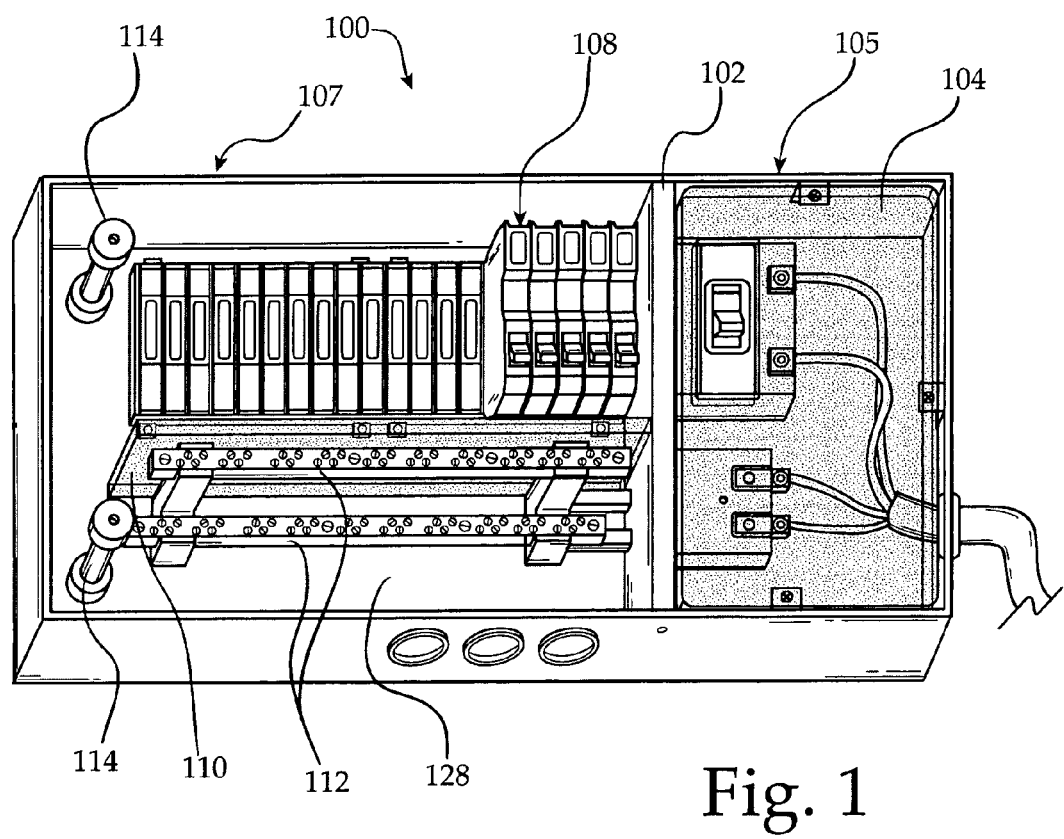
FIG. 1 is an image of the improved breaker panel of the present invention.
Figure 1A:
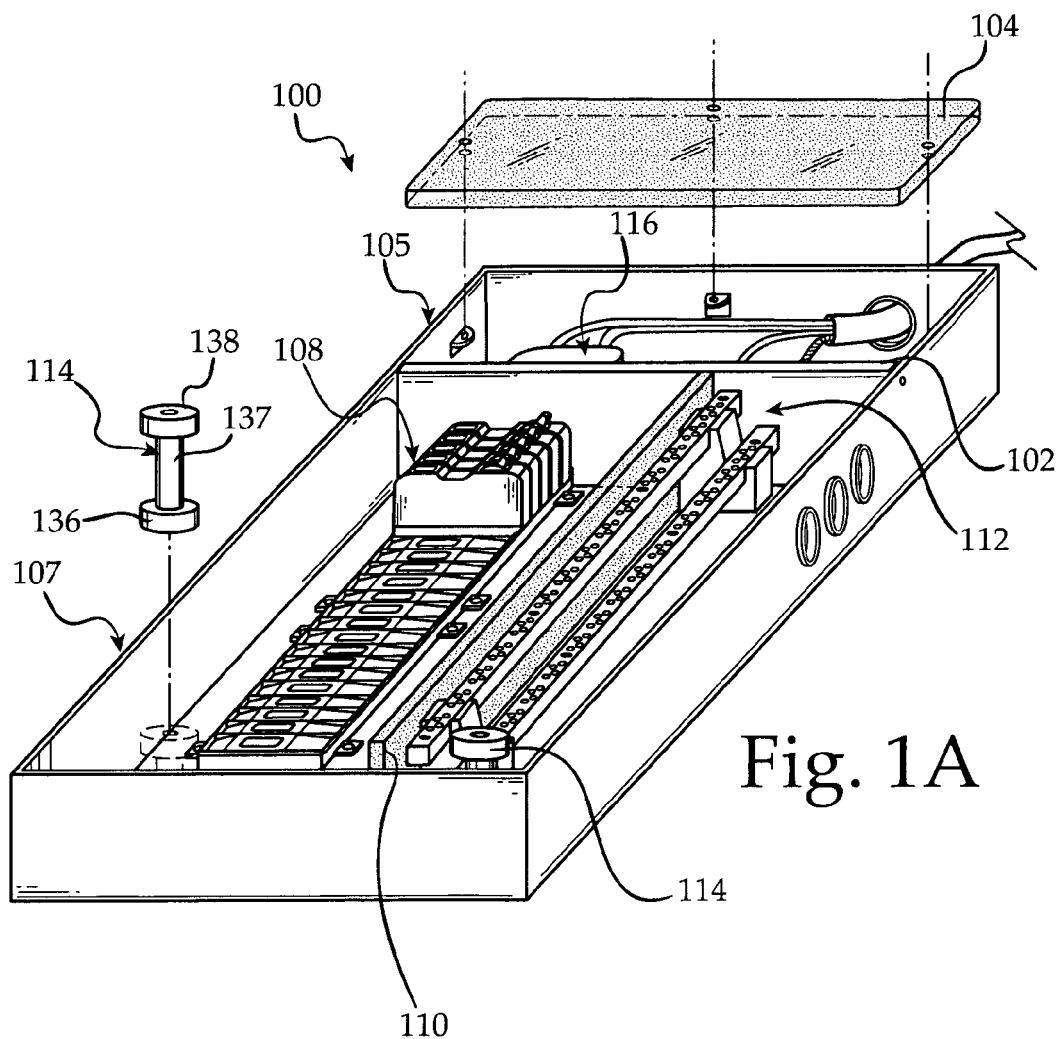
FIG. 1A is a top view of the improved circuit breaker of the present invention.

Referring to FIGS. 1 and 1A, one embodiment of the improved breaker panel 100 of the present invention is shown. The breaker panel 100 includes a plurality of shields and partitions that protect against accidental or unintended contact with the live electrical wires contained within. The main breaker shield 104 covers the area occupied by the main breaker 116. The circuit breaker partition 102 divides the area within the breaker panel 100 into two distinct areas, more particularly the main breaker area 105 and the circuit breaker area 107. The main breaker area 105 is the area occupied by the main breaker 116 and the circuit breaker area 107 is the area occupied by the circuit breakers, and other items, such as the bus bars 112. The circuit breaker area 107 also includes a bus bar shield 110. The bus bar shield 110 serves to separate the bus bar 112 from the other items within the circuit breaker area 107, such as the circuit breakers 108 and any other devices.

In operation, the breaker panel 100 includes a multitude of wires entering and exiting the panel, and connected to the circuit breakers 108 or other devices, and bus bars 112 contained within. Wires that are not neatly routed throughout the breaker panel are difficult to trace, and create a dangerous environment for operators providing service or maintenance. An embodiment of the present invention may also include one or more bending posts 114. The bending posts 114 are attached to the back panel and provide a guide or means of routing the wires contained within the breaker panel 100. The bending posts 114 allow an operator to easily install or trace wires and minimize the chances of wires becoming tangled and reduces the chances of misidentification of wires.

Figure 2:
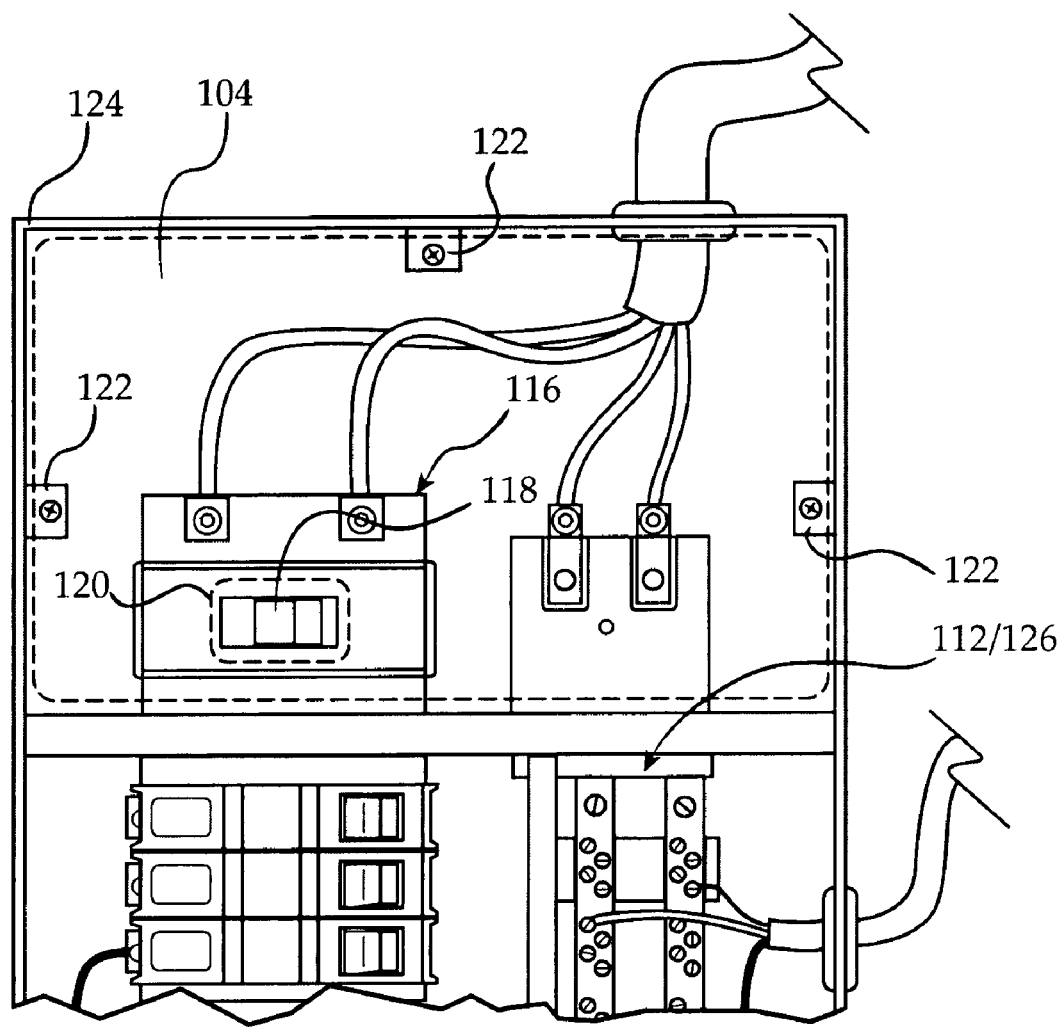
FIG. 2 is an image of main breaker compartment and main breaker shield of the present invention.

Referring to FIG. 2, the main breaker shield 104 of the present is shown. The main breaker shield 104 substantially encloses the area where the main power enters the breaker panel 100, as well as the main breaker 116. The main breaker shield 104 is attached to the wall 124 of the breaker panel 100 by a plurality of standoffs 122. While the illustrated embodiment utilizes sheet metal screws attached through preformed holes in the main breaker shield 104 and the standoffs 122, other methods of attaching the main breaker shield 104 to the breaker panel are within the scope of the invention. The main breaker shield 104 shown in the illustrated embodiment may be constructed of clear material to allow views of the components contained within. It is understood that the main breaker shield 104 and other shields utilized in the present invention may be constructed of non-metal or any other suitable material that may serve as a barrier or wall to guard against unintended contact with the electrical wires or components contained within. It is a further feature of the present invention to allow an operator to actuate the main breaker 116 as needed, while protecting him from inadvertently contacting the live wires attached thereto. A switch opening 120 is formed in the main breaker shield to allow access to the switch 118 of the main breaker 116.

Referring once again to FIG. 1, the circuit breaker shield 102 is substantially perpendicular to the back plate 128. The circuit breaker shield 102 serves to separate the interior of the breaker panel into two compartments. The first compartment, as discussed above, includes the main breaker 116, and the second compartment includes circuit breakers 108, other devices, and bus bars 112. The circuit breaker shield 102 may include one or more passageways to allow wires or junctions to communicate between components contained within the main breaker area 105 and components contained within the circuit breaker area 107. The circuit breaker shield 102 may be constructed of a non-metal or any suitable material for use within a breaker panel.

Figure 3:
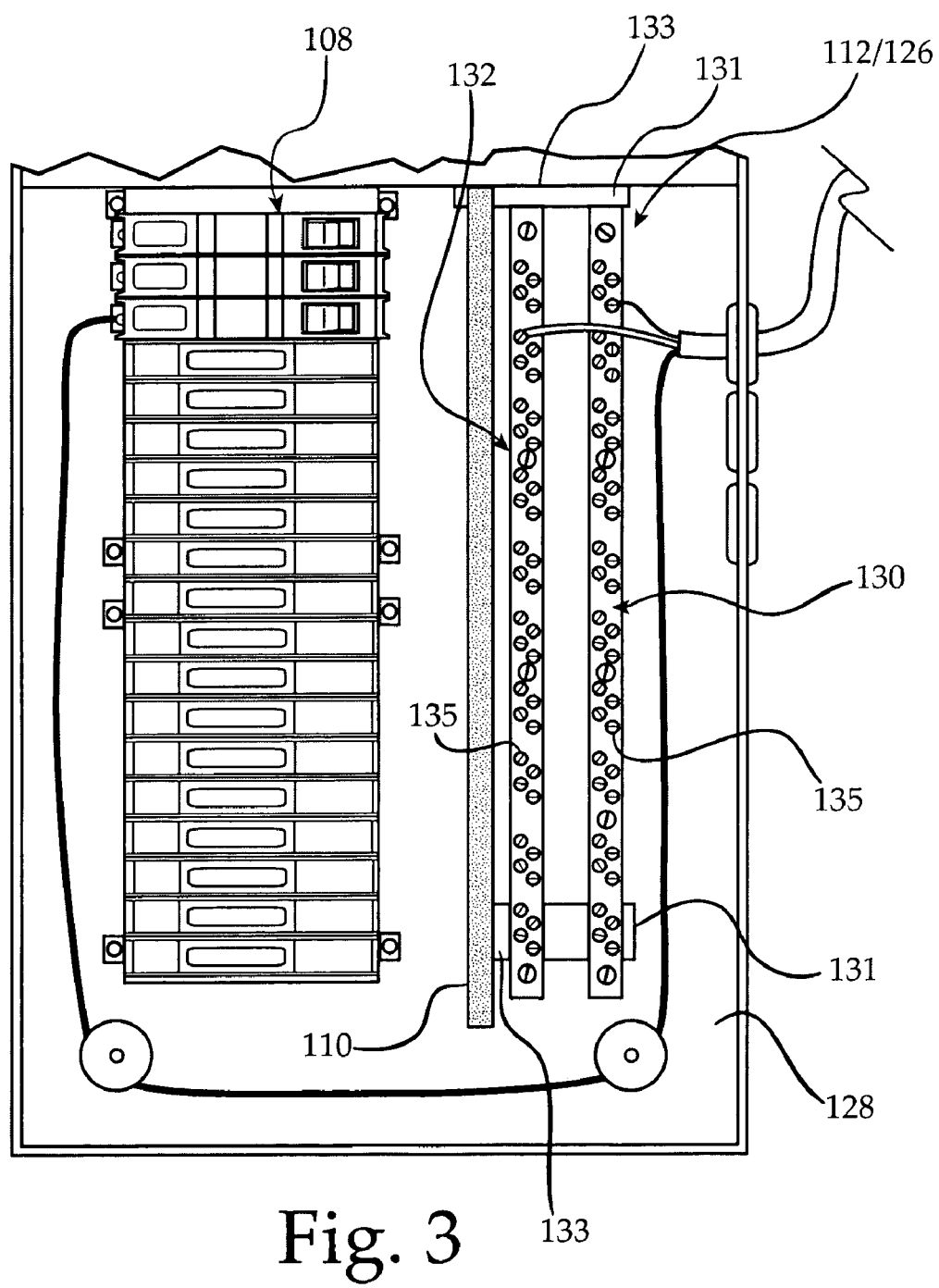
FIG. 3 is an image of the improved bus bar configuration of the present invention.

Referring now to FIG. 3, the improved bus bar configuration 126 of the present invention is shown. The proximity of the ground bar 130 to the neutral bar 132 is convenient for making connections to the bus bars 126. The bus bars 126 are substantially rectangular elongated bars, constructed from a conductive material, having a plurality of fastening screws 135. The fastening screws are configured to hold the conductor of a wire in electrical communication with the bus bar. The bus bars 126 are offset, such as by situating the neutral bus bar 132 in a higher position than the ground bus bar 130. This configuration makes it more difficult for a person to accidentally connect the neutral bus bar 132 directly to the ground bus bar 130 and makes it easier to install ground and neutral conductors without overcrowding such conductors or connecting conductors to the wrong bus. The ground bar 130 and the neutral bar 132 are each mounted to a pair of standoffs 131 and 133 respectively. The standoffs may be constructed from any material that supports the bus bar, and serves to isolate or connect the bus bar from the mounting point as desired, in this particular embodiment the back plate 128.

Figure 5:
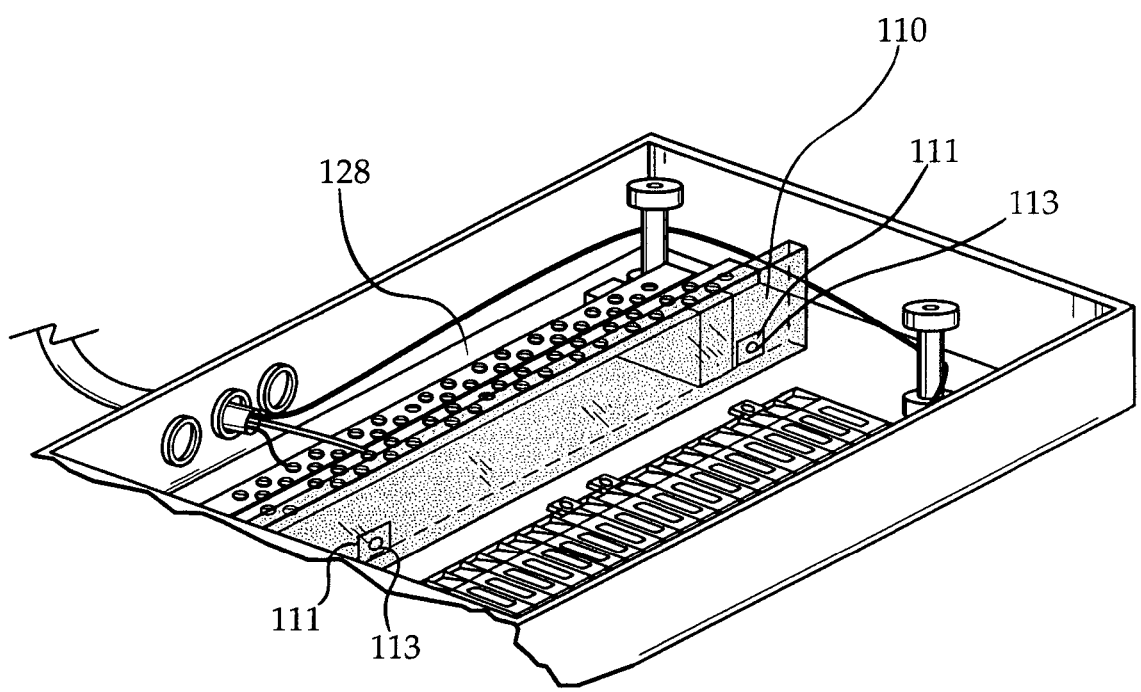
FIG. 5 is an image of the bus bar shield of the present invention.

A bus bar shield 110 is provided, separating the bus bars 126 from the other items within the circuit breaker area 107, such as the circuit breakers 108 and other devices. This bus bar shield 110 serves to safeguard against inadvertent contact between the ground or neutral bus bar and a power source connected to the circuit breakers or other devices. Referring now to FIG. 5, the bus bar shield 110 is substantially perpendicular to the back plate 128 and attaches to the breaker panel 100 via to a pair of standoffs 111. The bus bar shield 110 includes a pair of holes adapted to receive a pair of screws 113 protruding from standoffs 111. While the illustrated embodiment utilizes screws 113 attached through preformed holes in the bus bar shield 110 and the standoffs 111, other methods of attaching the bus bar shield 110 to the back plate 128 are within the scope of the invention. The bus bar shield 110 shown in the illustrated embodiment may be constructed of clear material to allow views of the components contained within. It is understood that the bus bar shield 110 and other shields utilized in the present invention may be constructed of a non-metal material or any other suitable material that may serve as a barrier or wall to guard against unintended contact with the electrical wires or components.

Figure 4:
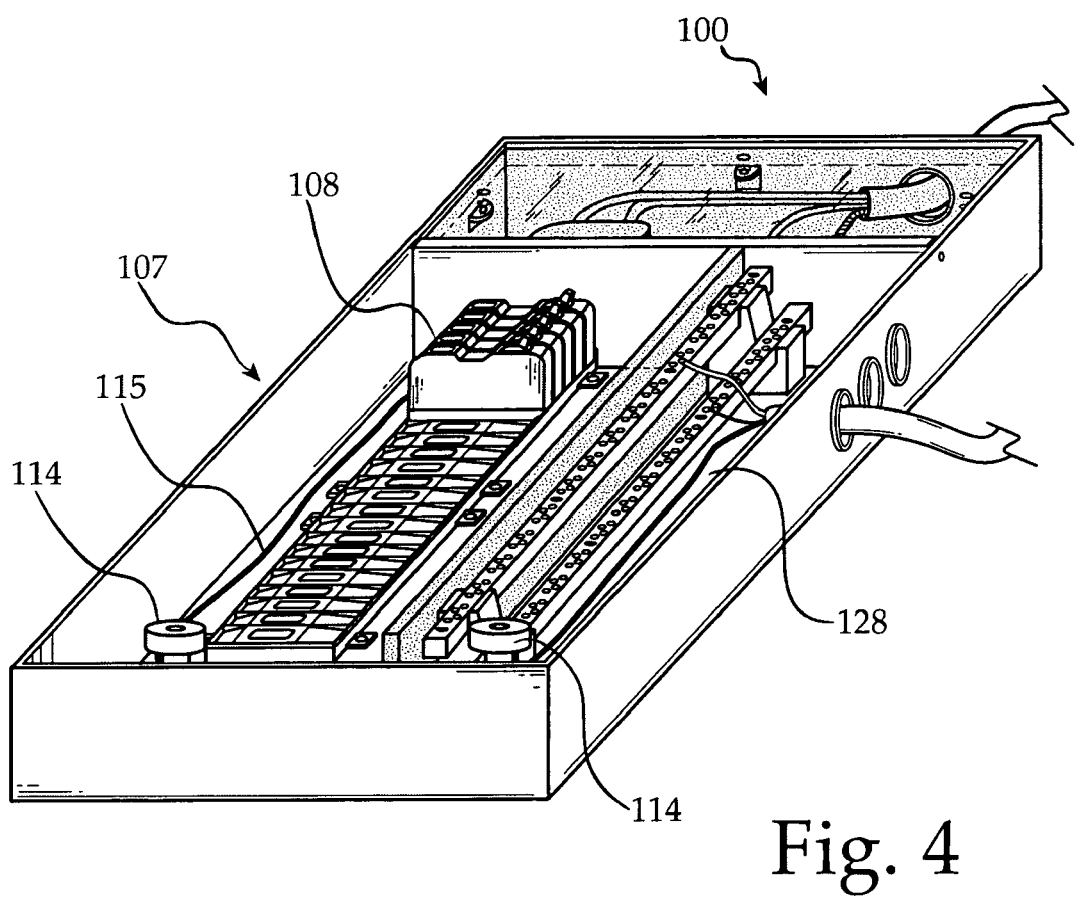
FIG. 4 is an image of the bending posts within the breaker panel of the present invention.

In use, the breaker panel 100 will include a multitude of wires entering and exiting the panel, and connected to the circuit breakers 108, fuses, and bus bars 112 contained within. To assure that these wires are neatly guided throughout the breaker panel one or more bending posts 114 are provided. Referring now to FIG. 4 and once again to FIG. 1A, the bending posts of the present invention are shown. The bending posts 114 are attached to the back panel and provide a guide or means of guiding the wire 115. The bending post 114 used in the illustrated embodiment of the invention include a base 136, a spool segment 137 and cap 138. The bending post 114 attaches to the back panel via the base 136. The base segment 136 includes a threaded recess adapted to receive a screw to fixedly attach the bending post to the base plate. Additional methods of attaching the base 136 of the bending post 114 to the back panel are possible. Above the base 136, the spool segment 137 is substantially cylindrical, and communicates with the wires guided with the bending post 114. The binding post terminates at the cap 138, which serves to prohibit the wires from sliding off of the spool segment 137. While the bending post in the illustrated embodiment is configured as described above, other bending post configurations are contemplated such as clips, combs, hooks, slotted partitions, or perforated devices. In the illustrated embodiment, the wire 115, enters the breaker panel 100 and connects to breaker. 108. The bending posts 114 serve to guide the wire about the interior perimeter of the breaker panel 100. This configuration prevents the wires from crossing over the circuit breakers 108, bus bars 126, or other components contained within the breaker panel 100. While the illustrated embodiment shows a particular number of bending posts 114, it is understood that the number of bending posts used, as well as positions of the posts can vary.

While this invention has been described as having particular embodiments, the present invention can be further modified within the spirit and scope of this disclosure. This application is therefore intended to cover any variations, uses, or adaptations of the present invention using the general principles disclosed herein.

The invention claimed is:

1. An improved circuit breaker panel, comprising:
   a main breaker mounted in the circuit breaker panel;
   a plurality of circuit breakers mounted in the circuit breaker panel; and
   a first shield mounted in the circuit breaker panel and between the main breaker and the plurality of circuit breakers;
   a ground bus bar and a neutral bus bar affixed to a back plate of the circuit breaker panel; and
   a bus bar shield mounted in the circuit breaker panel and between the bus bars and said plurality of circuit breakers.

2. The improved circuit breaker panel of claim 1 wherein said first shield is a wall between an area housing the main breaker and an area housing the plurality of for the circuit breakers.

3. The improved circuit breaker panel of claim 2 wherein said first shield and the area housing for the main breaker form a main breaker compartment, and further comprising a safety barrier mounted to the circuit breaker panel and in front of the main breaker compartment to prevent accidental contact with wires in the main breaker compartment.

4. The improved circuit breaker panel of claim 3 wherein said safety barrier is a transparent partition.

5. The improved circuit breaker panel of claim 1 wherein said neutral bus bar is offset from the back plate a different distance than said ground bus bar.

6. The improved circuit breaker panel of claim 1 wherein said bus bar shield is a substantially rectangular partition.

7. The improved circuit breaker panel of claim 1 further comprising at least one bending post affixed to said breaker panel for guiding a plurality of wires within said breaker panel.

8. An improved circuit breaker panel, comprising:
a first shield mounted in the breaker panel to separate a main breaker area from a circuit breaker area;
a second shield mounted to the breaker panel in front of the main breaker area to prevent accidental contact with wires in the main breaker area;
a third shield mounted in the breaker panel between a pair of bus bars and said circuit breaker area; and
at least one bending post affixed to said circuit breaker panel for guiding a plurality of wires within said breaker panel.

9. The improved circuit breaker panel of claim 8 wherein said pair of bus bars comprises a ground bus bar affixed to a back plate and a neutral bus bar affixed to the back plate proximate to said ground bus bar, wherein said neutral bus bar is offset from the back plate a different distance than said ground bus bar is offset from the back plate.

10. The improved breaker panel of claim 9 wherein said at least one bending post is affixed to said back plate of said circuit breaker panel.

* * * * *